US012424352B2

(12) United States Patent
Bruland

(10) Patent No.: US 12,424,352 B2
(45) Date of Patent: Sep. 23, 2025

(54) INSULATOR FOR HIGH-VOLTAGE APPLICATIONS

(71) Applicant: Maschinenfabrik Reinhausen GmbH, Regensburg (DE)

(72) Inventor: Matthias Bruland, Regensburg (DE)

(73) Assignee: MASCHINENFABRIK REINHAUSEN GMBH, Regensburg (DE)

(*) Notice: Subject to any disclaimer, the term of this patent is extended or adjusted under 35 U.S.C. 154(b) by 232 days.

(21) Appl. No.: 18/549,352

(22) PCT Filed: Mar. 3, 2022

(86) PCT No.: PCT/EP2022/055335
§ 371 (c)(1),
(2) Date: Sep. 7, 2023

(87) PCT Pub. No.: WO2022/189234
PCT Pub. Date: Sep. 15, 2022

(65) Prior Publication Data

US 2024/0153675 A1 May 9, 2024

(30) Foreign Application Priority Data

Mar. 11, 2021 (DE) ..................... 10 2021 105 875.9

(51) Int. Cl.
*H01B 17/00* (2006.01)
*H01B 17/14* (2006.01)
*H01B 17/32* (2006.01)

(52) U.S. Cl.
CPC ........... *H01B 17/14* (2013.01); *H01B 17/325* (2013.01)

(58) Field of Classification Search
CPC .............................. H01B 17/14; H01B 17/325
See application file for complete search history.

(56) References Cited

U.S. PATENT DOCUMENTS 8,278,557 B2 * 10/2012 Widmer ................ H01B 17/54
174/176
11,227,708 B2 * 1/2022 Clement ................ H01B 17/38
(Continued)

FOREIGN PATENT DOCUMENTS

CN 2220696 Y 2/1996
CN 110534267 A 12/2019
(Continued)

*Primary Examiner* — Pete T Lee
(74) *Attorney, Agent, or Firm* — LEYDIG, VOIT & MAYER, LTD.

(57) ABSTRACT

An insulator for high-voltage applications has a rotationally symmetrical hollow tube made from fiberglass-reinforced epoxy resin; a silicone shielding attached to a periphery of the hollow tube; a base flange at a lower end of the hollow tube; a retainer, which is configured to retain an electrical operator, at an upper end of the hollow tube; and a plug, which is arranged inside the hollow tube and closes the front side of the upper end of the hollow tube and seals the hollow tube from the outside. The retainer has a rotationally symmetrical connection region. The insulator further has at the upper end of the hollow tube, a radially circumferential joining region which has no silicone shielding. The retainer is connectable to the insulator in such a way that the connection region of the retainer surrounds the joining region of the insulator in a form-fitting fashion.

7 Claims, 4 Drawing Sheets

(56) References Cited

U.S. PATENT DOCUMENTS

| | | | |
|---|---|---|---|
| 2008/0083555 A1 | 4/2008 | Kim | |
| 2013/0025912 A1 | 1/2013 | Hoefner | |
| 2021/0027920 A1 | 1/2021 | Clement et al. | |
| 2021/0125755 A1* | 4/2021 | Ma | H01B 17/36 |

FOREIGN PATENT DOCUMENTS

| | | | |
|---|---|---|---|
| CN | 210516349 | U | 5/2020 |
| DE | 622269 | C | 11/1935 |
| DE | 102010015729 | A1 | 10/2011 |
| DE | 102010016384 | A1 | 12/2011 |
| WO | WO 2018191159 | A1 | 10/2018 |

* cited by examiner

INSULATOR FOR HIGH-VOLTAGE APPLICATIONS

CROSS REFERENCE TO RELATED APPLICATIONS

This application is a U.S. National Phase application under 35 U.S.C. § 371 of International Application No. PCT/EP2022/055335, filed on Mar. 3, 2022, and claims benefit to German Patent Application No. DE 10 2021 105 875.9, filed on Mar. 11, 2021. The International Application was published in German on Sep. 15, 2022 as WO 2022/189234 A1 under PCT Article 21(2).

FIELD

The present disclosure relates to an insulator for high-voltage applications, including a support insulator such as is used, for example, for supporting busbars, cables, reactors, or other operating means used in high-voltage engineering.

BACKGROUND

Operating means used in high-voltage engineering, such as busbars, cables, reactors, etc., work on a specific potential, and therefore, have to be insulated from ground and/or other potentials by a certain distance.

In order to retain and insulate from ground, busbars, cables, or reactors, one-part support insulators, or multi-part support insulators (i.e. those consisting and composed of a plurality of individual insulators) have been used for many decades.

WO 2018/191159 A1 discloses an air core reactor for use in an electrical energy transmission and distribution grid and which is mounted on an electrically insulated carrier structure and insulated from ground. The carrier structure comprises a plurality of support insulators, which each have at their upper end a mounting bracket, which is connected directly to the coil. In order to fasten the mounting bracket to the support insulator, the latter has a mounting flange, which is screwed and adhesively bonded to a flange of the support insulator.

However, due to the high currents and voltages and the magnetic fields occurring as a result, the whole device is also exposed to environmental influences such as, for example, the local weather conditions and high forces, in particular bending, torsional, tensile, and compressive forces. The flange connection between the coil or its fastening devices and the support insulators here represents a weak point and thus a potential source of error.

Furthermore, the mounting of the mounting bracket on the flanges of the support insulators on site is time-consuming as each mounting bracket has to be positioned correctly and then screwed tight with a plurality of screws. Angular misalignments, which still occur may here also need to be corrected.

SUMMARY

In an embodiment, the present disclosure provides an insulator that is for high-voltage applications, which has a rotationally symmetrical hollow tube made from fiberglass-reinforced epoxy resin; a silicone shielding attached to a periphery of the hollow tube; a base flange at a lower end of the hollow tube; a retainer, which is configured to retain an electrical operator, at an upper end of the hollow tube; and a plug, which is arranged inside the hollow tube and closes the front side of the upper end of the hollow tube and seals the hollow tube from the outside. The retainer has a rotationally symmetrical connection region. The insulator further has at the upper end of the hollow tube, a radially circumferential joining region which has no silicone shielding. The retainer is connectable to the insulator in such a way that the connection region of the retainer surrounds the joining region of the insulator in a form-fitting fashion.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
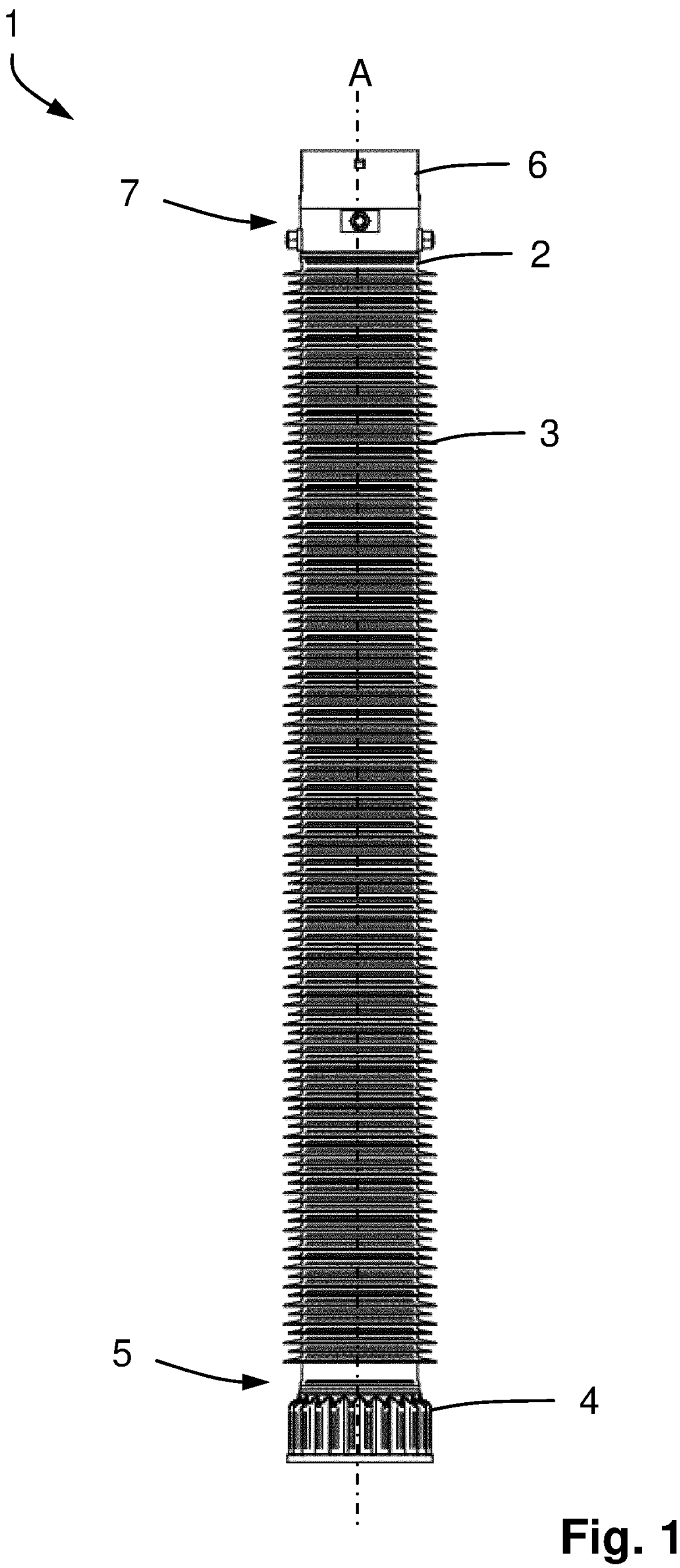
FIG. 1 shows an advantageous embodiment of the insulator according to the improved concept in a side view.

Aspects of the present disclosure provide an improved concept for the connection of a support insulator to a retainer for operating means used in high-voltage engineering which, in addition to high strength, also enables simple mounting of the device on site.

Accordingly, an insulator for high-voltage applications, in particular a support insulator, which comprises an essentially rotationally symmetrical hollow tube made from fiberglass-reinforced epoxy resin, a silicone shielding attached to the periphery of the hollow tube, and a base flange arranged at a lower end relative to a longitudinal axis A of the hollow tube, is provided. At an upper end relative to the longitudinal axis A of the hollow tube, the insulator has a retainer for an operating means for high-voltage applications. Such operating means can be, for example, a reactor which is supported on a plurality of insulators by means of toothed ring, or a busbar which is retained by the insulator so that it is remote from ground.

The insulator furthermore has a closure element, which is arranged inside the hollow tube and closes the front side of the upper end relative to the longitudinal axis A of the hollow tube, and seals it from the outside. The closure element is preferably designed as a circular plug with a diameter which interacts with the internal diameter of the hollow tube in such a way that the hollow tube is closed airtightly.

The retainer has a rotationally symmetrical connection region. The connection region is provided at an end of the retainer, which faces the hollow tube. At the upper end relative to the longitudinal axis A of the hollow tube, the insulator has a radially circumferential joining region which has no silicone shielding. The retainer can be connected to the insulator in such a way that the connection region of the retainer surrounds the joining region of the insulator in a form-fitting fashion, i.e. with a precise fit.

The improved concept thus offers a connection technology between the support insulator and an operating means for high-voltage applications that is detachable and at the same time can be mounted in a stable and simple manner. The retainer, with or without the operating means for which it is provided, can be placed onto the support insulators on site. There is here no need to adhesively bond the retainer to the hollow tube.

According to an embodiment of the improved concept, the closure element, the hollow tube, and the retainer each have at least one transverse bore which are oriented coaxially with one another. A safety bolt, for example with one or more nuts, can be pushed into the in each case at least one transverse bore and fixed therein. Two safety bolts which are arranged perpendicularly to each other and one below the other are preferably used.

The connection remains detachable by virtue of the safety bolts. At the same time, the retainer is fixed in relation to the closure element and the hollow tube and consequently additionally strengthens the connection in terms of the form fit.

The safety bolt is preferably formed from steel, plastic, in particular fiberglass-reinforced plastic, or from a ceramic material.

According to a further embodiment of the improved concept, the form-fitting connection between the retainer and the insulator, in particular the joining region of the insulator, is designed as a conical connection.

The conical connection is preferably designed in such a way that the external diameter of the hollow tube of the insulator reduces toward the upper end relative to the longitudinal axis A. Accordingly, the internal diameter of the connection region of the retainer becomes greater toward that end of the retainer which faces the hollow tube.

The conical design of the connection enables self-centering of the retainer on the insulator and thus more simple mounting of the operating means on the support insulators. In addition, the conical connection offers a greater strength than a conventional flange connection, in particular when a transverse force is exerted which is due to the improved form fit.

According to a further embodiment of the improved concept, the closure element and the retainer are made from a non-metallic material.

The non-metallic material of the retainer preferably takes the form of a fiber-reinforced plastic, particularly preferably is made from fiberglass-reinforced epoxy resin. The retainer can be produced, for example, by means of injection-molding, vacuum infusion, and/or winding methods.

The non-metallic material of the closure element preferably takes the form of a fiber-reinforced plastic, particularly preferably is made from fiberglass-reinforced epoxy resin. The closure element can be produced, for example, by means of injection-molding, vacuum infusion, and/or winding methods.

The non-metallic material of the closure element can preferably also take the form of a ceramic material.

The forming of the components from non-metallic material prevents these components from being heated by the magnetic fields surrounding them.

According to a further embodiment of the improved concept, the retainer has means for fastening at least one busbar. For this purpose, the retainer preferably has a first U-shaped cutout and a second U-shaped cutout situated opposite the first which lie outside the connection region and are suitable for receiving a busbar.

The retainer for fastening the at least one busbar preferably furthermore has a spring element which fixes the at least one busbar in the U-shaped cutouts in relation to the retainer.

According to a further embodiment of the improved concept, the retainer has means for fastening at least one reactor. The retainer preferably has a first and a second groove which lie outside the connection region and are suitable for receiving a toothed ring.

According to a further embodiment of the improved concept, the retainer forms the lower end relative to a longitudinal axis of a hollow tube of a further insulator or part of the lower end of the hollow tube of a further insulator. The insulators are preferably designed identically with respect to one another. In particular, the insulators together form a multi-part support insulator.

Further embodiments and implementations of the insulator are directly evident from the various embodiments.

Aspects of the present disclosure are explained below in detail on the basis of exemplary embodiments with reference to the drawings. Components which are identical or functionally identical or which have an identical effect may be provided with identical reference signs. Identical components or components with an identical function are in some cases explained only in relation to the figure in which they first appear. The explanation is not necessarily repeated in the subsequent figures.

FIG. 1 shows an advantageous embodiment of the insulator according to the improved concept in a side view. The insulator 1 has an essentially rotationally symmetrical hollow tube 2 made from fiberglass-reinforced epoxy resin with a silicone shielding 3 attached to the periphery of the hollow tube 2. A base flange 4, on which the insulator 1 is mounted in a perpendicular position, is arranged on a lower end 5 relative to a longitudinal axis A of the hollow tube 2. A retainer 6 for an operating means for high-voltage applications (referred to herein also as an "electrical operator") is fastened at an upper end 7 of the hollow tube 2, opposite the lower end 5. Such operating means can be, for example, a reactor which is supported on one or more insulators by means of toothed ring, or a busbar which is retained by the insulator so that it is remote from ground. In the case of FIG. 1, the retainer 6 is provided for a reactor. Further detail will be given about a retainer for a busbar as part of the explanation of a further alternative embodiment. A further insulator is also a possible operating means. In this case, the insulator is composed of a plurality of separate insulators which can be connected to one another via the retainer 6. The further insulator then no longer has a base flange and instead the retainer 6 is designed as part of the hollow tube 2 at the lower end 5 of the hollow tube 2.

Figure 2:
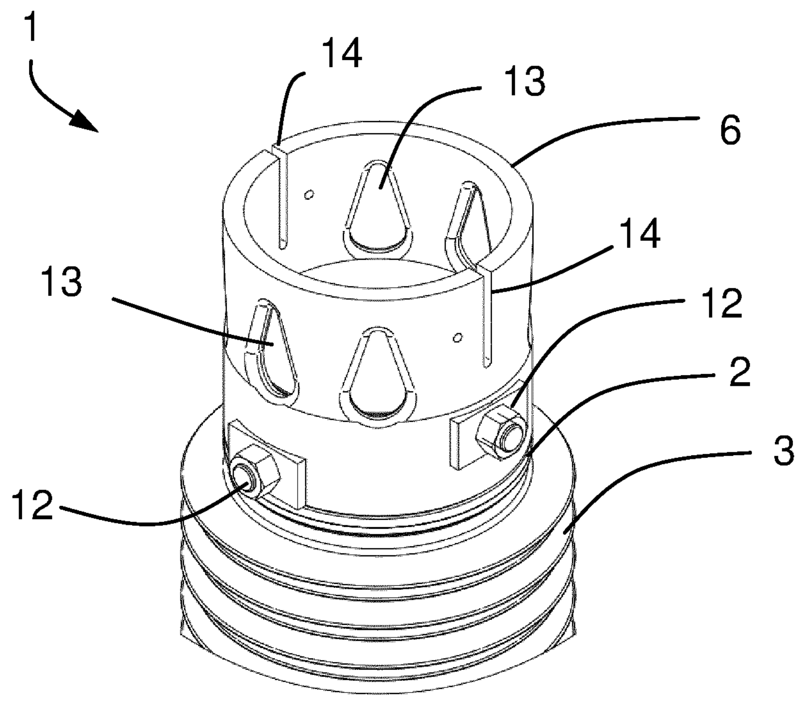
FIG. 2 shows a detailed view of the insulator from FIG. 1 in a perspective illustration.

FIG. 2 shows a detailed view of the insulator from FIG. 1 in a perspective illustration. To be more precise, the upper end 7 of the insulator 1 is shown here in detail with the assembled retainer 6. The silicone shielding 3 which has been attached to the hollow tube 2, and the rotationally symmetrical retainer 6, are visible. In this embodiment, the retainer 6 serves to support a reactor. For this purpose, the retainer 6 has two grooves 14, arranged opposite each other, for receiving a toothed ring, and a plurality of drop-shaped cutouts 13 for fixing the toothed ring and the coil by means of resin-impregnated fiber bundles which are threaded through the cutouts 13.

A further detailed view of the insulator from FIG. 1 in shown in an exploded view and illustrated in section in FIG.

3. The retainer 6 is illustrated here as separated from the hollow shaft 2 in order to clearly illustrate the closure of the hollow tube 2 and the connection between the retainer 6 and the hollow tube 2.

The insulator 1 or the hollow tube 2 has a closure element 8, which is arranged at the upper end 7 of the hollow tube 2 in its inner cavity and is designed as a circular plug, and its diameter $D_V$ is dimensioned such that the plug 8 airtightly closes the front side of the hollow tube 2 and seals it from the external environment. The diameter $D_V$ is, for example, in a range between 150 mm and 600 mm, preferably between 200 mm and 580 mm.

The retainer 6 comprises a connection region 9 at its end facing the hollow tube 2. This connection region 9 interacts with a radially circumferential joining region 10 arranged at the upper end 7 of the hollow tube 2. The joining region 10 has no silicone shielding 3 and has an external diameter $D_A$ which reduces, relative to the longitudinal axis A, from a maximum diameter $D_{A\ max}$ to a minimum diameter $D_{A\ min}$ toward the upper end 7 of the hollow tube 2. Accordingly, the internal diameter $D_I$ of the connection region 9 of the retainer 6 increases from a minimum diameter $D_{I\ min}$ to a maximum diameter $D_{I\ max}$ toward the end facing the hollow tube 2. The difference between the respectively maximum external and internal diameter $D_{A\ max}$, $D_{I\ max}$ and the respectively minimum external and internal diameter $D_{A\ mm}$, $D_{I\ min}$, i.e. ultimately the width of the cone, lies in a range between 10 mm and 50 mm, and the difference is preferably 20 mm. The minimum external and internal diameter $D_{A\ mm}$, $D_{I\ min}$ can be, for example, 200 mm or 350 mm or 580 mm, and the maximum external and internal diameter $D_{A\ max}$, $D_{I\ max}$ can accordingly be 220 mm or 370 mm or 600 mm.

Figure 4:
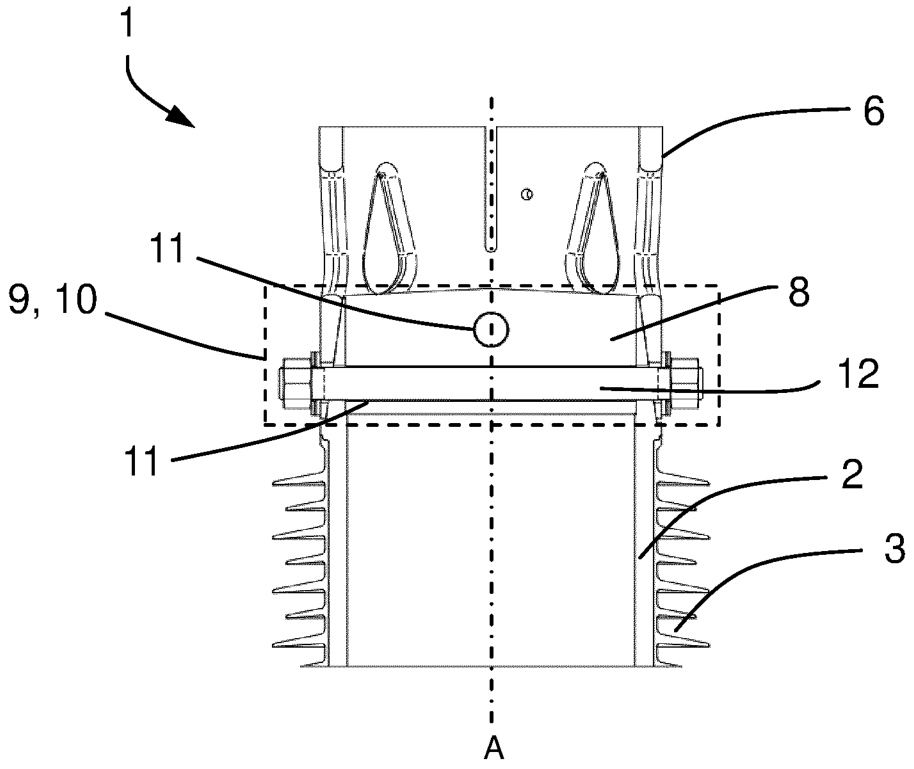
FIG. 4 shows a further detailed view of the insulator from FIG. 1 in a side view and illustrated in section.
Figure 3:
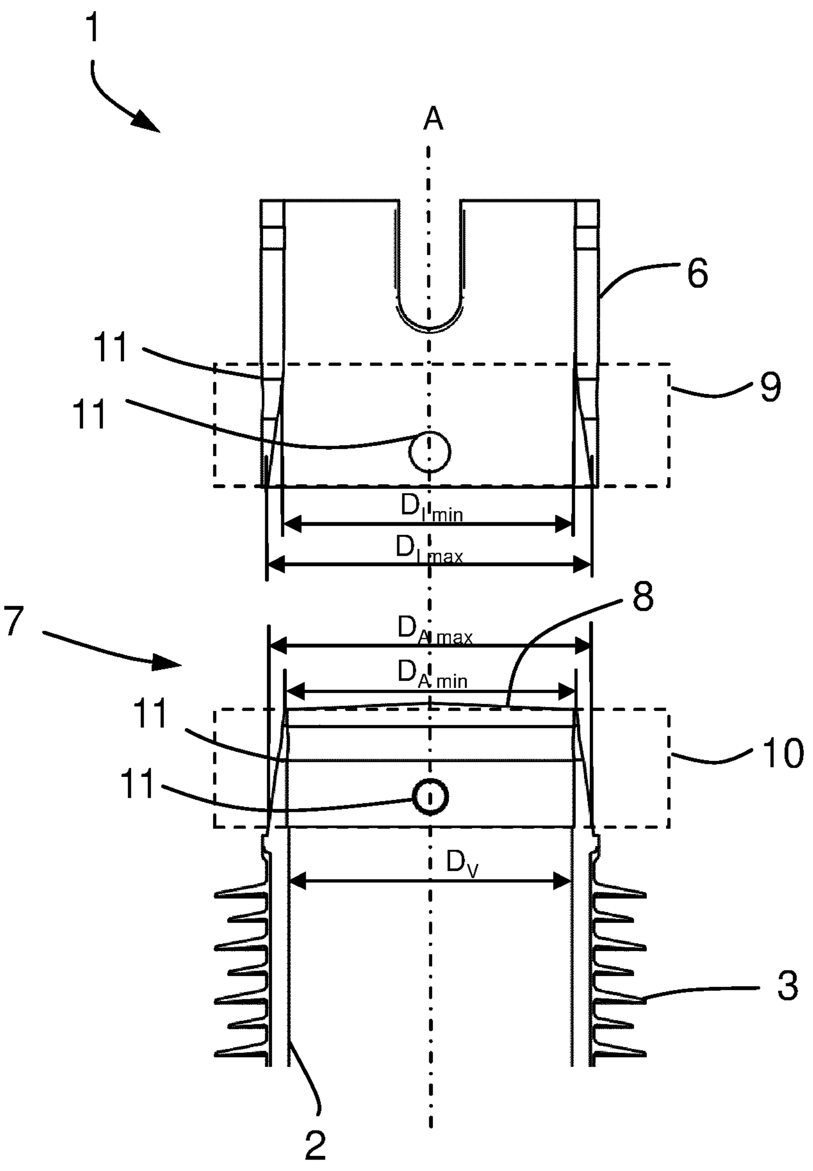
FIG. 3 shows a further detailed view of the insulator from FIG. 1 in an exploded view and illustrated in section.

During the mounting, the retainer 6 is placed onto the joining region 10 of the hollow tube 2 such that it surrounds the joining region 10 with its connection region 9 in a form-fitting fashion, i.e. completely surrounds it. This is illustrated in FIG. 4 in a further detailed view of the insulator from FIG. 1 in a side view and illustrated in section. The conical design of the joining region 10 and the connection region 9 relative to each other causes the retainer 6 to surround the hollow tube 2 in its joining region 10 in a form-fitting fashion, i.e. completely, and allows it to be positioned in a self-centering fashion on the hollow tube 2 during the mounting.

In each case two transverse bores 11 are provided in the retainer 6, the hollow tube 2, and the closure element 8 or the plug. The transverse bores 11 are each oriented coaxially relative to each other. In each case one safety bolt 12 is pushed through them and fixed in the transverse bores 11 by means of two nuts. The safety bolts 12 are preferably formed from steel, plastic, in particular fiberglass-reinforced plastic, or from ceramic.

Figure 5:
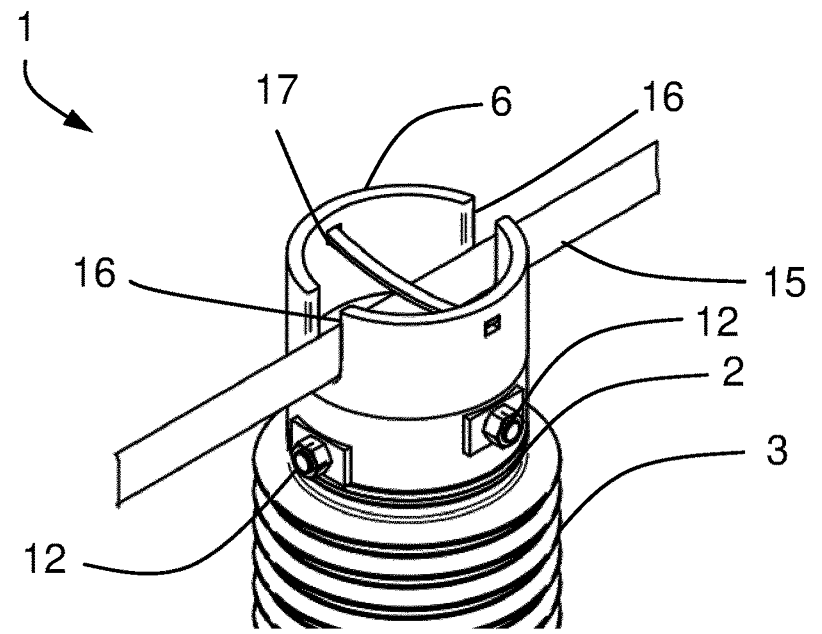
FIG. 5 shows a detailed view of a further advantageous embodiment of the insulator according to the improved concept in a perspective illustration.
Figure 6:
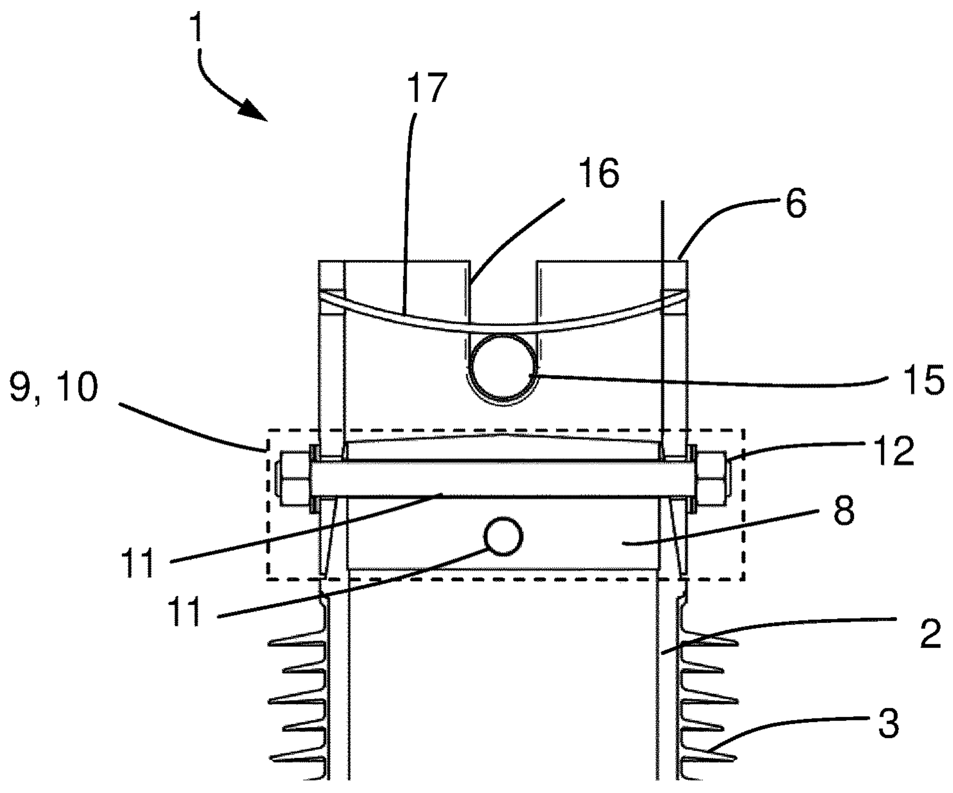
FIG. 6 shows a further detailed view of the insulator from FIG. 4 in a side view and illustrated in section.

A detailed view of a further advantageous embodiment of the insulator according to the improved concept is illustrated respectively in FIGS. 5 and 6 in one case in perspective (FIG. 5) and in the other case in a side view and illustrated in section (FIG. 6). The insulator 1 corresponds essentially to the insulator 1 explained above. Reference is therefore made analogously to the corresponding explanations. The insulator 1 illustrated in FIGS. 4 and 5 differs, however, in that the retainer 6 is provided for fastening a busbar 15. This concept is employed, for example, in substations when fixing busbars, wherein a certain distance from ground needs to be maintained. For this purpose, the retainer 6 preferably has a first U-shaped cutout 16 and a second U-shaped cutout 16, arranged opposite the first, which lie outside the connection region 9 and are designed in terms of their dimensioning for receiving a busbar 15. A spring element 17, preferably a leaf spring, which fixes the busbar 15 in relation to the retainer 6 by it pressing the busbar 17 into the U-shaped cutout 16 with its spring force is provided for fixing the busbar 15 in the U-shaped cutout 16.

With the improved concept, a connecting technology for head armatures of support insulators for the field of application of high-voltage engineering is provided, which is suitable for connection of a support insulator to a continuation tube geometry, wherein the tube geometry serves as a retainer for an operating means in high-voltage engineering. Compared with a conventional flange connection, the improved connecting technology affords the advantage that it is detachable and nevertheless can here withstand higher forces. The conical connection enables both the transmission of force by a frictional fit and a form fit and self-centering during the mounting. The connection remains detachable by virtue of the safety bolts but at the same time the retainer is fixed in relation to the closure element and the hollow tube and consequently additionally strengthens the connection in terms of the form fit.

It is assumed that the present disclosure and many of the attendant advantages thereof can be understood from the above description. Furthermore, it is clear that various changes can be made to the shape, construction, and arrangement of the components without departing from the disclosed subject matter or without sacrificing all material advantages. The embodiment described is merely explanatory and such changes are intended to be covered by the following claims. Furthermore, it is understood that the invention is defined by the following claims.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 insulator
2 hollow tube
3 shielding
4 base flange
5 lower end of 2
6 retainer
7 upper end of 2
8 closure element
9 connection region of 6
10 joining region of 1
11 transverse bore
12 safety bolt
13 cutout
14 groove
15 busbar
16 U-shaped cutout
17 spring element
A longitudinal axis of 2
$D_A$ external diameter of 10
$D_{A\ max}$ maximum external diameter of 10
$D_I$ internal diameter of 9
$D_{I\ max}$ maximum internal diameter of 9
$D_V$ diameter of 8

The invention claimed is:

1. An insulator for high-voltage applications, the insulator comprising:

a rotationally symmetrical hollow tube made from fiberglass-reinforced epoxy resin;

a silicone shielding attached to a periphery of the hollow tube;

a base flange at a lower end of the hollow tube;

a retainer, which is configured to retain an electrical operator, at an upper end of the hollow tube; and a plug, which is arranged inside the hollow tube and closes the front side of the upper end of the hollow tube and seals the hollow tube from the outside, wherein the retainer has a rotationally symmetrical connection region, wherein the insulator further comprises at the upper end of the hollow tube, a radially circumferential joining region which has no silicone shielding, and wherein the retainer is connectable to the insulator in such a way that the connection region of the retainer surrounds the joining region of the insulator in a form-fitting fashion.

2. The insulator as claimed claim 1, wherein:

the plug, the hollow tube and the retainer each have at least one transverse bore which are oriented coaxially with one another; and the insulator is configured such that a safety bolt is pushable into the, in each case, at least one transverse bore and is fixable therein.

3. The insulator as claimed in claim 1, wherein:

the form-fitting connection between the retainer and the insulator is designed as a conical connection.

4. The insulator as claimed in claim 1, wherein;

the plug and the retainer are made from a non-metallic material.

5. The insulator as claimed in claim 1, wherein;

the retainer has means a fastener for fastening at least one busbar.

6. The insulator as claimed in claim 1, wherein;

the retainer has means-a fastener for fastening at least one reactor.

7. The insulator as claimed in claim 1, wherein;

the retainer forms the lower end of a hollow tube of a further insulator.

* * * * *